(No Model.)

F. H. RICHARDS.
WEIGHING MACHINE.

No. 600,043. Patented Mar. 1, 1898.

Witnesses:
O. W. Smith
Fred. J. Dole.

Inventor:
F. H. Richards (No Model.) 5 Sheets—Sheet 3.

F. H. RICHARDS.
WEIGHING MACHINE.

No. 600,043. Patented Mar. 1, 1898.

Witnesses:
O. W. Smith
Fred. J. Dole

Inventor:
F. H. Richards (No Model.) 5 Sheets—Sheet 4.

F. H. RICHARDS.
WEIGHING MACHINE.

No. 600,043. Patented Mar. 1, 1898.

Witnesses:
C. W. Smith
Fred. J. Dole.

Inventor:
F. H. Richards (No Model.)  5 Sheets—Sheet 5.
F. H. RICHARDS.
WEIGHING MACHINE.
No. 600,043. Patented Mar. 1, 1898.
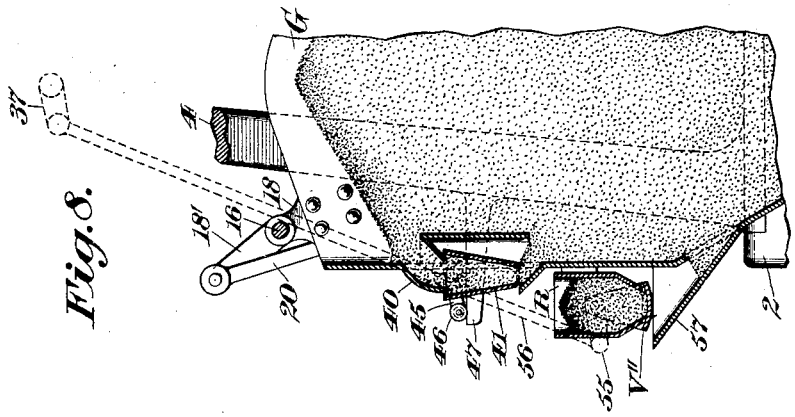
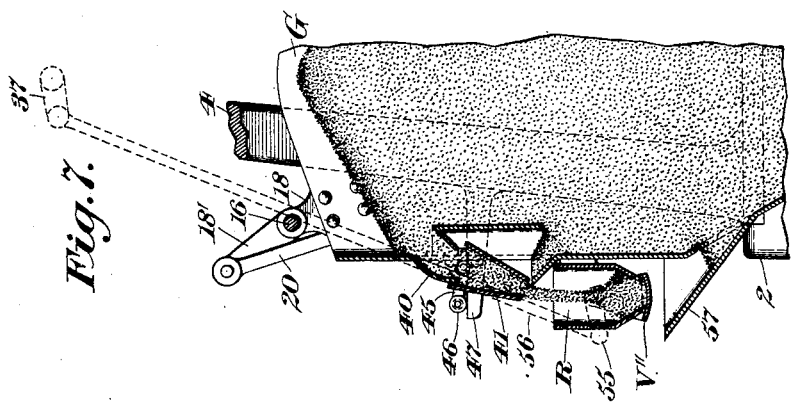
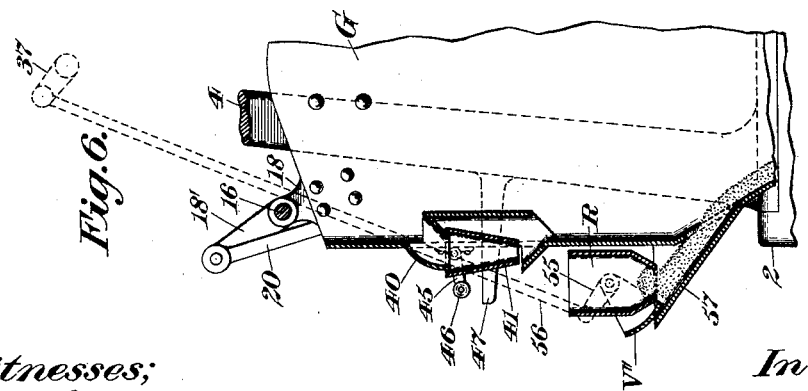
Witnesses:
O. W. Smith
Fred. J. Dole.
Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 600,043, dated March 1, 1898.

Application filed September 20, 1897. Serial No. 652,241. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

My invention relates to weighing-machines; and the object thereof is to provide means for effecting the transmittal of the force or energy generated by a stream of material to different points on the machine, the advantage being that said stream is intercepted and the load-receiver cannot be carried down prematurely, as forces are applied to the weighing mechanism at its opposite sides, one force serving, substantially, to neutralize the effect of the other.

Figure 1:
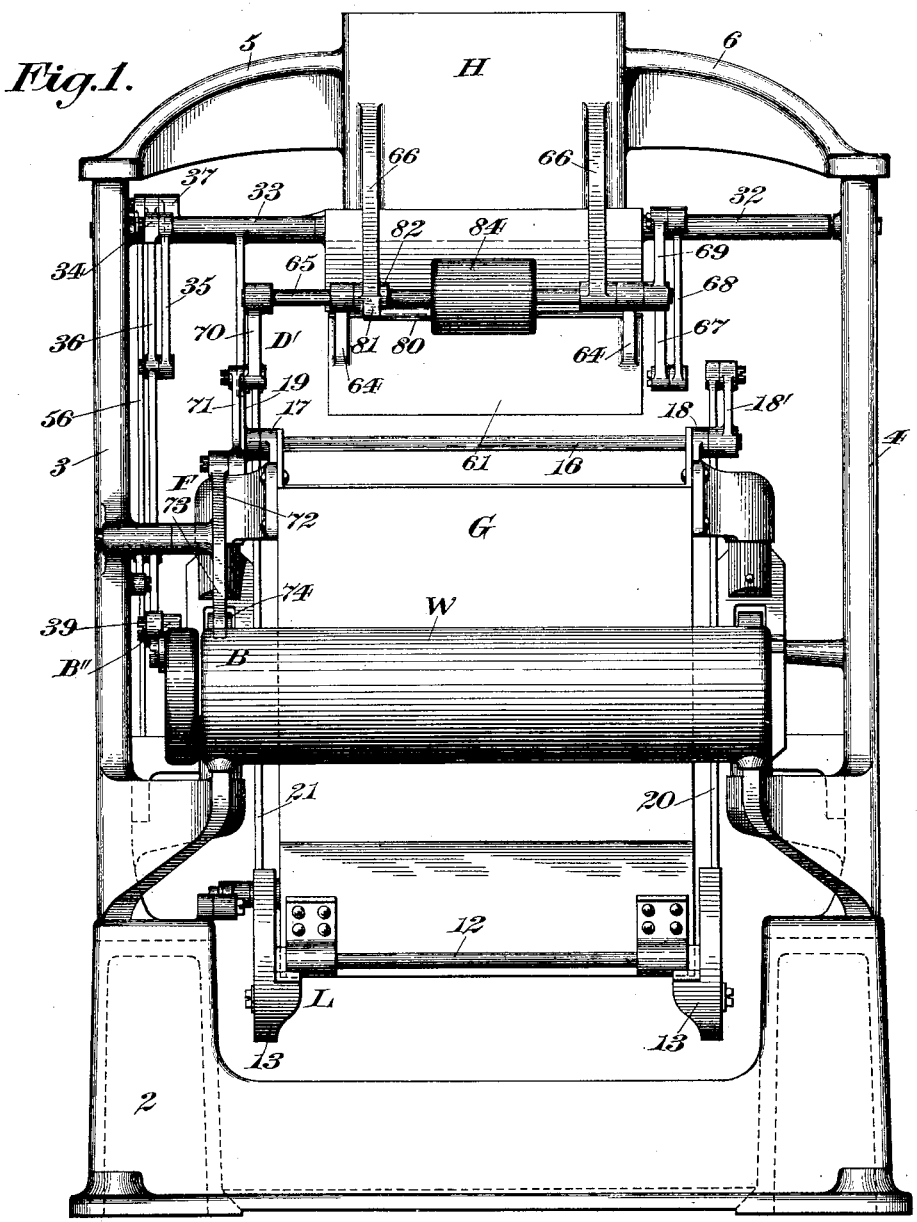
Figure 2:
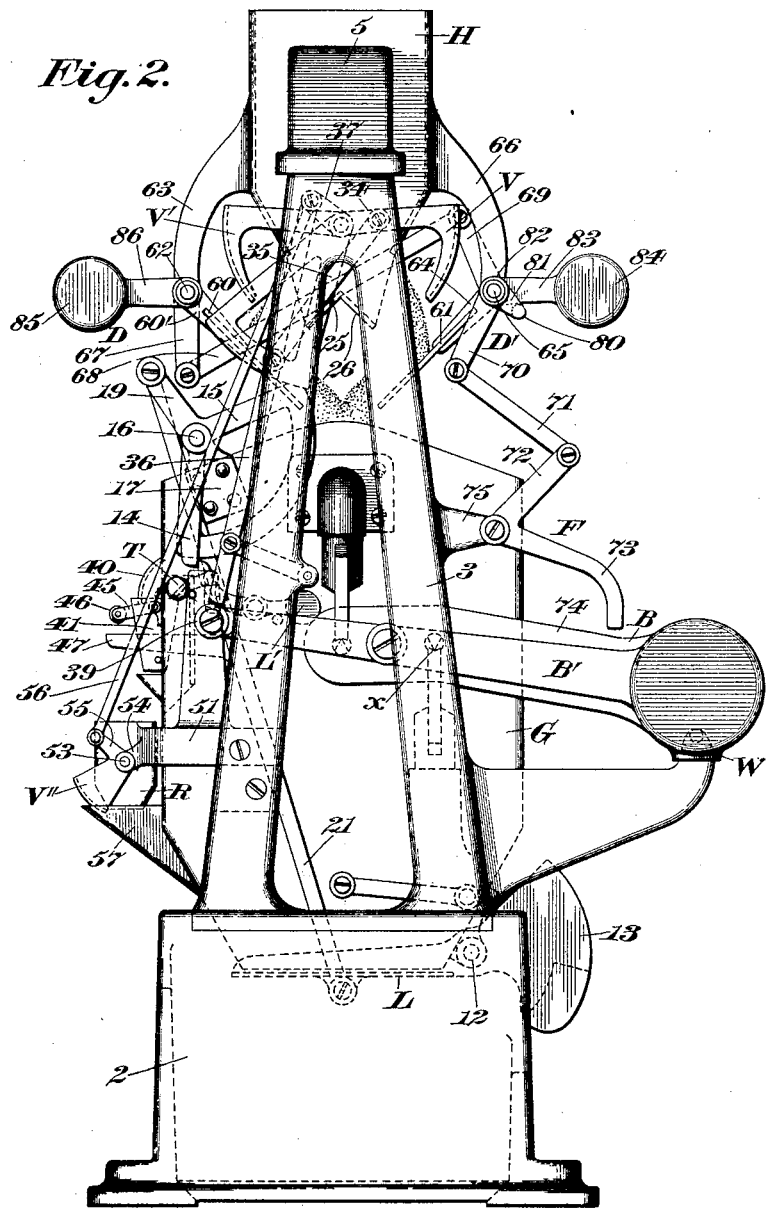
Figure 3:
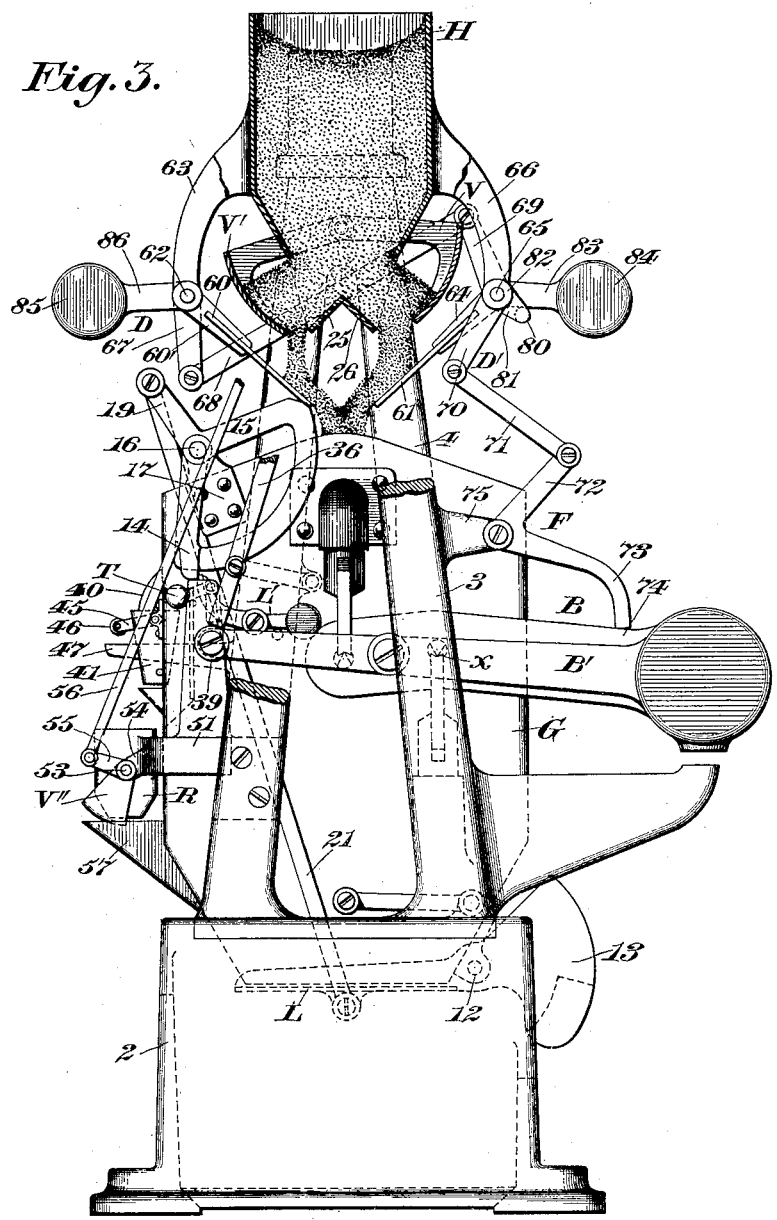
Figure 4:
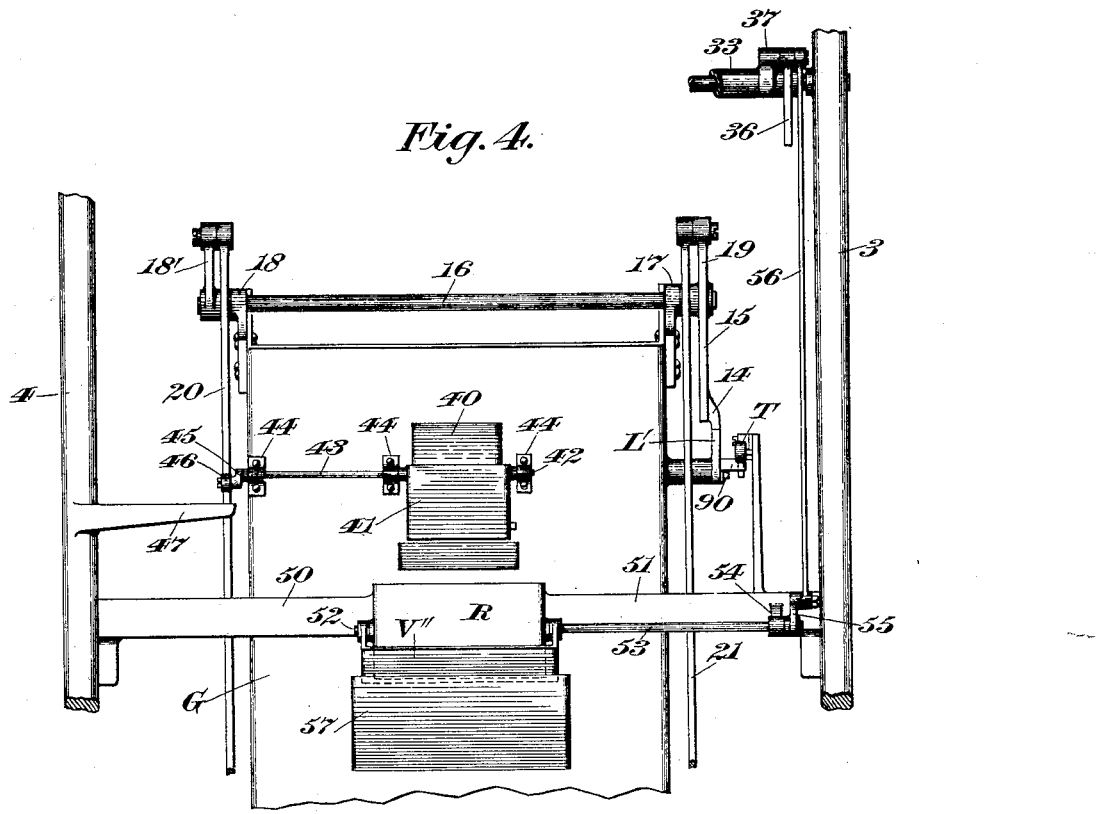
Figure 5:
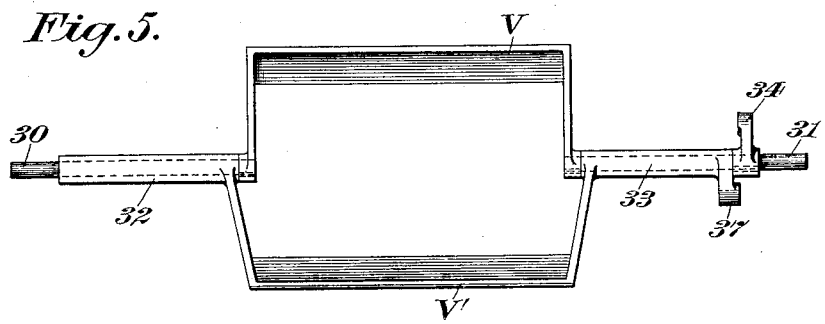

In the drawings accompanying and forming part of this specification, Figure 1 is a rear elevation of my improved weighing-machine. Figs. 2 and 3 are side elevations of the same as seen from the left in Fig. 1, the load-receiver being shown, respectively, in its highest and substantially middle positions. Fig. 4 is a front elevation of a portion of the machine, illustrating more particularly the load-reducing and resupplying means on the load-receiver. Fig. 5 is a plan view of the valve mechanism; and Figs. 6, 7, and 8 are transverse sectional views of the load-receiver and adjacent parts, illustrating the load-reducing and resupplying means in the positions occupied thereby during the making of a load.

Similar characters designate like parts in all the figures of the drawings.

The framework for sustaining the different parts of the machine may be of any suitable construction, and it is represented consisting of the chambered base or bed 2, the side frames or columns 3 and 4, rising therefrom, and the brackets 5 and 6, which extend laterally from the supply-chute, the hopper H constituting a simple and convenient means for delivering a supply or plurality of streams of material to the load-receiver of the weighing mechanism.

The weighing mechanism consists in the present case of a load-receiver, as G, and a scale-beam, as B, therefor, these parts being supported in a well-known manner.

The weighing mechanism includes poising and counterpoising means. The poising means consists of that part of the machine to the left of the axis $x$ of oscillation of the scale-beam B and the counterpoising means of the part thereof at the opposite side of said axis. In other words, the poising means is made up of the load-receiver G and a part of the scale-beam, while the counterpoising means consists of the remainder of the scale-beam, including the counterweight W.

The load-receiver G has the usual discharge-outlet normally covered by the closer or discharge-valve L, pivoted to the load-receiver at 12 and counterweighted at 13, said counterweight serving to shut the closer on the discharge of a load.

The means for holding the closer shut includes a latch L', of the ordinary kind, counterweighted and pivoted to the load-receiver and in proper position to engage the arm 14 of the rocker 15, carried by the rock-shaft 16.

The rock-shaft 16 is supported in the bearings 17 and 18 on the upper end of the load-receiver and is provided at one end with a crank-arm 18', to which and to the arm 19 of the rocker the rods 20 and 21 are pivoted, said rods being similarly jointed at their lower ends to the opposite sides of the closer L. On the completion of a load or the removal of the surplus the latch L' is tripped, as will hereinafter appear, which results in the release of the closer, and the weight of the load in the load-receiver G then forces said closer open.

The floor of the supply-hopper H is composed of the two oppositely-inclined sections 25 and 26, forming the lower walls of two side outlets in said hopper, through which streams of material may flow in different or reverse directions, for a purpose that will hereinafter appear, the streams being controlled by valves, as V and V', closable under the side outlets in said hopper to stop the passage of material to the load-receiver at the proper time.

The valve V (see Fig. 5) is secured to a two-part shaft consisting of the outwardly-disposed arms or members 30 and 31, terminating in journal portions supported in bearings in the end frames 3 and 4. The valve V' is provided with the oppositely-disposed longitudinal sleeves 32 and 33, encircling the two sections 30 and 31, respectively, of the two-part valve-shaft, so that said valves may be simultaneously and reversely operated alternately to open and close the same.

The shaft-section 31 is equipped with the crank-arm or projection 34, to which the link 35 is pivoted, said link being similarly joined at its lower end to the rod 36, pivoted at its upper end to the crank-arm or projection 37 on the valve-sleeve 33. The lower or free end of the rod 36 rests upon a projection (shown as an antifriction-roll 39) on the inner end of the auxiliary beam B', pivoted on the main beam B and constructed and operable in a manner similar to that indicated in many Letters Patent granted to me.

The inner end of the auxiliary beam constitutes, in effect, an extension of the poising end of the beam B, and, it being in contact with the rod 36, the closure of the valves V and V' will be properly governed as the load-receiver G descends, it being understood that the two valves close by gravity.

When the auxiliary beam B' returns to its initial position, it imparts an upward thrust to the rod 36, which, being transferred to the two valves V and V', swings the same open.

The hopper H, in connection with the two valves V and V', constitutes the means employed for overloading the receiver G, the filled receiver being carried to and below the so-called "poising-line" when it is overloaded, and during such motion the load-reducing means are brought into action for effecting the withdrawal of the surplus.

The load-reducing means consists of a spout 40 on the front part of the load-receiver and a swinging spout or tubular conduit 41, oscillatory below said spout 40 and adapted, when swung in one direction, to permit the surplus to pass from the load-receiver G into a suitable receptacle, as R, hereinafter described. (See Figs. 6, 7, and 8.)

The swinging spout 41 is provided with trunnions 42 and 43, carried in brackets 44 on the front wall of the load-receiver, the trunnion 43 being longer than the other and carrying at its outer end the crank-arm 45, having a roll or projection 46 at its free end adapted to strike against the actuator 47, consisting of an arm or extension on the side frame 3.

In Fig. 6 the load-receiver is represented empty and in Fig. 7 having an overload, in which latter case it is carried down sufficiently far to permit the roll 46 to strike the rigid arm 47, which results in swinging said spout to the left, thereby permitting the surplus to pass from the load-receiver, through the stationary spout 40 and spout 41, into the valved surplus-containing receptacle R, as illustrated in Fig. 7. As the lightened load-receiver rises on the withdrawal of the surplus the spout 41 will resume its primary position, (shown in Fig. 8,) it having a preponderance of weight below its center of movement to accomplish this result.

The surplus-receiver R is carried on the framework, it being provided with wings 50 and 51, secured to the side frames 3 and 4, respectively, as shown in Fig. 4, the valve therefor being designated by V''.

The valve V'' is equipped with pivot-pins 52 and 53, working in bearings on the receptacle R, the pin 53 being also supported by the bracket 54 on the wing 51 and having at its outer end the crank 55, to which the rod 56 is jointed, said rod at its upper end being connected with the crank-arm or projection 37 on the sleeve 33 of the valve V'. By reason of the connection just described the valve V'' will shut in unison with the main or supply valves V and V', so that the surplus will be discharged into the receptacle R, as indicated in Fig. 7. When the valves V and V' are opened, the valve V'' will also be opened to permit the material contained within the receiver R to pass therefrom, such material being emptied into the trough 57 on the front end of the load-receiver, which communicates therewith. The material thus discharged forms the first part of a new load.

In connection with overloading means I provide one or more devices for effecting the transmittal of the force or energy generated by a body of material supplied to said weighing mechanism to different points thereon, so that the load-receiver cannot be prematurely carried down. The means illustrated for accomplishing this result consists of devices termed "stream-force transmitters," and in this particular my present invention is a modification of that covered by my contemporaneously-pending application, Serial No. 651,503, filed September 13, 1897.

The stream-force transmitters D and D' are mounted to receive the impact of the supply-streams of material which flow toward the load-receiver and are adapted to transmit the combined force or energy of said streams to the counterpoised side of the scale-beam. Each of the devices D and D' includes a plate (designated, respectively, by 60 and 61) carried, preferably, upon the framework and disposed in the paths of the streams issuing from the hopper H, as indicated in Fig. 3. The plate 60 is provided at its opposite ends with the arms 60', secured to the rock-shaft 62, journaled in hangers 63 on the front end of the hopper. The plate 61 is equipped with a similar pair of arms 64, secured to the rock-shaft 65, carried by the hangers 66 on the rear side of the hopper H.

The rock-shaft 62 is provided with the crank-arm 67, to which the rod 68 is attached, said rod being also pivoted to the crank-arm 69 on the shaft 65, so that the plate 60 will transfer the force generated by the supply-stream to the shaft 65, which also receives the force due to the impact of one of the streams upon the plate 61, and the combined force thus resulting will be transferred from the shaft 65 to the weighing mechanism, or, as represented, to the counterpoised side of the beam B. The shaft 65 is equipped with a second rock-arm 70, to which the link 71 is pivoted, said link being likewise jointed to the arm 72 of the angular force-transmitting device F, pivoted to the lug 75 on the side frame 3, the leg 73 on which device is in position to act against the counterpoised side of the arm 74 of the beam B when said side has been raised for a certain distance.

The plates 60 and 61 are disposed in the paths of movement of the laterally-flowing streams from the hopper H; but they do not transmit to the weighing mechanism the force generated by said streams until the poising side of said mechanism has descended a short distance, for if such were the case said mechanism would be blocked and could not operate.

The leg 73 of the device F is shown in Fig. 2 situated slightly above the beam-arm 74, it being held in such position by the stop 80, extending laterally from the ear 81 on the hub 82, upon which the arm 83 rests, said arm being provided with a weight 84, which, in connection with a similar weight 85 on the arm 86, secured to the rock-shaft 62, holds the plates 60 and 61 in position to be acted upon by the supply-streams. The plates, by reason of their support in the manner described, may yield if they are struck by any large lumps in the supply, and may be promptly returned to their effective positions by the weights 84 and 85. The force of impact of the divided portions of the stream as they strike the two plates is transferred, through the described connections, to the counterpoised side of the scale-beam B, the material when it passes between said plates entering the load-receiver G, so that opposing forces are applied to the weighing mechanism at different periods, one force serving to neutralize substantially the effect of the other, whereby the weighing mechanism is compelled to operate in a predetermined order.

The usual latch-tripper of the "by-pass" type familiar in this class of machines is designated by T, it operating, on the upstroke of the load-receiver, to strike the latch-pin 90 thereof, thereby tripping the latch and releasing the closer, the load being discharged into the chamber or compartment of the base 2. The tripper T is jointed to the upper end of the post or riser on the wing-piece 51.

The operation of the hereinbefore-described machine is as follows: Fig. 2 shows the positions of the different parts of the machine at the commencement of operation, the valves V and V' being wide open and the closer shut and held in such position by the latch L', which engages the arm 14 of the rocker 15, whereby a supply of large volume may enter the load-receiver in two streams, which respectively strike the plates 60 and 61. When a certain portion of the load has been received by the load-receiver G, it will descend, thereby carrying the arm 74 of the beam B against the leg 73 of the force-transmitting device F, whereby the force transmitted by the two plates 60 and 61 as the stream of material from the hopper H strikes the same is applied in part to the beam, and subsequently, when the stream flows into the load-receiver, is also applied to the latter, the opposite forces tending to retard the downward movement of the load-receiver G. When the load-receiver reaches the limit of its downward movement, the load-reducing means will be rendered effective to permit the gravitation of the surplus therefrom, and this is accomplished when the crank-arm 45 strikes the actuator 47 on the side frame 3, as indicated in Fig. 7, thereby swinging the spout 41 to the left and emptying the surplus in the receptacle R, the lightened receiver G then rising. When the surplus has been entirely removed, the tripper T will strike the latch L' in the usual manner, thereby releasing the closer L, so that the latter may be discharged into the chamber of the base 2. When the closer shuts, the other parts of the machine will be returned to their primary positions to repeat the operation.

Having described my invention, I claim—

1. The combination, with weighing mechanism including a load-receiver, of overloading means for the same; load-reducing means including a movable spout; and means on the framework of the machine for actuating the spout to effect the removal of the surplus.

2. The combination, with weighing mechanism including a load-receiver, of overloading means for the same; load-reducing means including a swinging spout, for effecting the removal of the surplus; and an arm on the framework of the machine, for actuating the spout.

3. The combination, with weighing mechanism including a load-receiver, of overloading means for the load-receiver; load-reducing means including a swinging spout; a crank-arm connected with the spout; and an arm on the framework of the machine, for engaging said crank-arm.

4. The combination, with weighing mechanism including a load-receiver, of overloading means for the load-receiver; load-reducing means including a spout; pivots for the spout, supported by the load-receiver, one of the pivots having a crank-arm; and an actuator on the framework of the machine, disposed in the path of movement of said crank-arm.

5. The combination, with weighing mechanism including a load-receiver, of overloading means for the same; means mounted on said load-receiver for effecting the removal of the surplus and comprehending a swinging spout; a crank-arm connected with said spout; an actuator on the framework of the machine, disposed in the path of movement of said crank-arm; a surplus-receiving receptacle having a valve; and connections between said valve and the overloading means.

6. The combination, with weighing mechanism, of stream-supplying means; a pair of oppositely-oscillatory valves movable about the same axis; a shaft secured to one of the valves; a sleeve secured to the other valve and encircling said shaft; crank-arms on the shaft and sleeve, respectively; a link connected to one crank-arm; and a rod connected to the other crank-arm and also to the link and in position to be operated by the weighing mechanism.

7. The combination, with weighing mechanism, of stream-supplying means; valves; a shaft secured to one of the valves; a sleeve secured to the other valve and encircling said shaft; crank-arms on the shaft and sleeve, respectively; means connected with said crank-arms and governed by the weighing mechanism; a surplus-receiving receptacle provided with a valve; and a connection between said last-mentioned valve and one of said crank-arms.

8. The combination, with a load-receiver and supporting-beam mechanism therefor, of a hopper having a plurality of outlets; oppositely-oscillatory valves movable about an axis in common and serving to control the streams flowing from said outlets; oppositely-disposed shaft-sections secured to one of the valves; oppositely-disposed sleeves secured to the other valves and encircling the respective valve-sections; a crank-arm on one of the sleeves; an oppositely-disposed crank-arm on one of the shaft-sections; a link connected to one of the crank-arms; and a rod connected with the other crank-arm and also to said link and in position to be acted upon by the beam mechanism.

9. The combination, with weighing mechanism including a load-receiver, of means for supplying a series of streams of material to said load-receiver; stream-controlling means; and devices operating independent of the stream-controlling means and located to receive the impact of said streams and to transmit the force generated thereby to the weighing mechanism.

10. The combination, with weighing mechanism including a load-receiver, of means for supplying streams of material thereto; a plurality of valves located to control the respective streams; devices independent of the valves and located in the paths of the streams and to receive the impact thereof; connections between said devices; and means for transferring the force applied to said devices from the respective streams to the weighing mechanism.

11. The combination, with weighing mechanism including a load-receiver, of means for supplying streams of material thereto; devices supported independently of the weighing mechanism and located in the paths of the streams to receive the impact thereof; connections between said devices; and means for transmitting the force applied to said devices to the weighing mechanism.

12. The combination, with weighing mechanism including a load-receiver, of means for supplying a stream of material thereto; a shaft supported independently of the weighing mechanism; a plate secured to said shaft and disposed in the path of movement of said stream; and means located between said shaft and the weighing mechanism for transmitting the force generated by the stream to the weighing mechanism.

13. The combination, with weighing mechanism including a load-receiver and a scale-beam, of means for supplying a stream of material thereto; a plate disposed in the path of movement of said stream; and a device mounted on the framework and in position to bear against the scale-beam, connected with the plate.

14. The combination, with weighing mechanism including a load-receiver, of means for supplying a stream of material thereto; a plate disposed in the path of movement of said stream and mounted on the framework; a device carried by the framework and in position to act against the weighing mechanism; and connections between the latter and said plate.

15. The combination, with weighing mechanism including a load-receiver, of means for supplying a stream of material thereto; a shaft supported independently of the weighing mechanism; a plate secured to said shaft and disposed in the path of movement of said stream; means located between said shaft and the weighing mechanism for transmitting the force applied by the stream to said shaft to the weighing mechanism; and a weight connected with said shaft for holding the plate in its primary position.

16. The combination, with weighing mechanism including a load-receiver and a scale-beam, of means for supplying a stream of material thereto; a plate disposed in the path of movement of said stream; a device mounted on the framework in position to bear against the scale-beam, connected with the plate; and means for holding said device in its effective position.

17. The combination, with weighing mechanism including a load-receiver, of means for supplying a stream of material thereto; a plate disposed in the path of movement of said stream and mounted on the framework; a shaft carrying said plate; a counterweighted arm secured to the shaft; a stop in position to sustain said counterweighted arm; and connections between the shaft and the weighing mechanism for transmitting the force applied by the stream to the plate to the weighing mechanism.

18. The combination, with weighing mechanism including a load-receiver, of means for supplying streams of material thereto; plates disposed in the paths of movement of said streams; shafts mounted independently of the weighing mechanism and having crank-arms, said plates being secured to said shafts; a connection between the crank-arms; and means between one of the shafts and the weighing mechanism for transmitting the force applied to the plates by the streams to the weighing mechanism.

FRANCIS H. RICHARDS.

Witnesses:
F. N. CHASE,
FRED. J. DOLE.